(12) United States Patent
Kawamura et al.

(10) Patent No.: US 10,013,204 B2
(45) Date of Patent: Jul. 3, 2018

(54) COLUMNAR DATA STORAGE ON TAPE PARTITION

(71) Applicant: INTERNATIONAL BUSINESS MACHINES CORPORATION, Armonk, NY (US)

(72) Inventors: Kousei Kawamura, Tokyo (JP); Koichi Masuda, Tokyo (JP); Sosuke Matsui, Higashimurayama (JP); Yutaka Oishi, Kawasaki (JP); Takahiro Tsuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/792,895

(22) Filed: Oct. 25, 2017

(65) Prior Publication Data
US 2018/0046400 A1  Feb. 15, 2018

Related U.S. Application Data

(63) Continuation of application No. 15/421,463, filed on Feb. 1, 2017, now Pat. No. 9,830,104, which is a
(Continued)

(51) Int. Cl.
G11B 15/46 (2006.01)
G11B 5/584 (2006.01)
G06F 3/06 (2006.01)

(52) U.S. Cl.
CPC .......... G06F 3/0644 (2013.01); G06F 3/0604 (2013.01); G06F 3/0643 (2013.01); G06F 3/0682 (2013.01)

(58) Field of Classification Search
CPC ............ G11B 20/1201; G11B 5/00813; G11B 2020/295; G11B 19/045; G11B 20/10305; G11B 20/18; G11B 2020/1292; G11B 15/52; G11B 15/1875; G06F 17/30315; G06F 3/0619; G06F 3/065; G06F 3/0682;
(Continued)

(56) References Cited

U.S. PATENT DOCUMENTS 8,949,192 B2  2/2015  Kaijima et al.
8,954,663 B1  2/2015  Klein et al.
(Continued)

OTHER PUBLICATIONS

Abadi, "Query Execution in Column-Oriented Database Systems", Massachusetts Institute of Technology, Feb. 2008, pp. 1-148, Copyright Massachusetts Institute of Technology 2008.
(Continued)

Primary Examiner — Nabil Hindi
(74) Attorney, Agent, or Firm — L. Jeffrey Kelly

(57) ABSTRACT

A method for writing data from a table to a tape includes setting a number of partitions on the tape, where the number of partitions is greater than or equal to a number of columns of the table to be written to the tape, and writing data from each column of the table to at least one partition of the tape, the at least one partition including two or more wraps, the data is written from a top of the two or more wraps towards a bottom of the two or more wraps in a direction of a width of the at least one partition. The written data is reciprocated from a beginning of the tape to an end of the tape in a longitudinal direction of the tape such that writing of a last data entry of one column ends at a beginning of the two or more wraps.

5 Claims, 5 Drawing Sheets

Related U.S. Application Data continuation of application No. 15/139,384, filed on Apr. 27, 2016, now Pat. No. 9,595,291.

(58) Field of Classification Search
CPC ... G06F 3/30073; G06F 3/0644; G06F 3/0656
See application file for complete search history.

(56) References Cited

U.S. PATENT DOCUMENTS

| | | |
|---|---|---|
| 9,595,291 B1 | 3/2017 | Kawamura et al. |
| 2015/0169655 A1 | 6/2015 | Gupta |

OTHER PUBLICATIONS

Pending U.S. Appl. No. 15/421,463, filed Feb. 1, 2017, entitled: "Columnar Data Storage on Tape Partition", 23 pages.
IBM: List of IBM Patents or Patent Applications Treated as Related (Appendix P), Jan. 8, 2018, 2 pages.

1 : Data are stored column-by-column

2 : Data are stored row-by-row

COLUMNAR DATA STORAGE ON TAPE PARTITION

BACKGROUND

The present invention generally relates to a method for writing data on a tape medium, and more specifically, to a method for writing tabular data including two or more rows and two or more columns on a tape column by column.

Currently, columnar databases represent the basis for big data analytics. A columnar database, also known as a column-oriented database, is a database management system (DBMS) that stores data in columns rather than in rows as relational DBMSs. The most relevant characteristic of columnar databases is that the data is stored across rows unlike traditional row-oriented relational databases, in which the data in each row of a table is stored together. Columnar databases provide great flexibility, performance, and scalability which facilitates managing large volumes and variety of data.

SUMMARY

The present invention provides a method for reducing the seek time in reading a particular column or columns from all of the rows in a certain table of a columnar database and reducing the time required for reading by dividing the tape into a plurality of partitions and storing the respective columns in different partitions. That is, the columns are each stored in different partitions when a table of a columnar database is to be stored in one tape, thereby reducing the seek time in reading a particular column or columns of a certain table from all of the rows of the table and reducing the time required for reading the columns.

In one aspect of the present invention, a method of writing data of a tabular form including at least two or more rows and columns on a tape column by column is provided. The method includes the steps of (a) setting partitions with at least a number greater than or equal to a number of columns to a tape, and (b) writing data of each column in one corresponding partition. The partition has at least two or more wraps. The data is written in order toward the bottom of the wraps from the top of the wraps in the width direction of the partition while reciprocating the beginning of the tape to the end of the tape in the longitudinal direction of the tape so that the writing of the last data of the column ends at the beginning of the corresponding wrap.

In another aspect of the present invention, a method of setting partitions on a tape when writing data of a tabular form including at least two or more rows and columns on the tape column by column is provided. The method includes the steps of (a) obtaining data size S1 of a column to be written to the tape, (b) dividing the data size S1 of the column by data size S2 of a wrap of the tape to obtain a quotient N which rounds down fraction, (c) if the quotient N being an odd number, setting number of wraps in a partition which data of the column is written to (N+1), and (d) if the quotient N being an even number, setting number of wraps in a partition which data of the column is written to (N+2).

In another aspect of the present invention, a storage system for managing files using a file system including a host and at least one tape drive which is able to communicate with the host is provided. Under the control of the file system to be executed by the host, for writing data of a tabular form including at least two or more rows and columns on a tape column by column, the tape drive performs the steps of (a) setting partitions with at least a number greater than or equal to a number of columns to a tape, and (b) writing data of each column in one corresponding partition. The partition has at least two or more wraps. The data is written in order toward the bottom of the wraps from the top of the wraps in the width direction of the partition while reciprocating the beginning of the tape to the end of the tape in the longitudinal direction of the tape so that the writing of the last data of the column ends at the beginning of tape.

In another aspect of the present invention, a computer program product for writing data on a tape loaded in a tape drive is provided. The tape has at least two or more partitions. Each partition has at least two or more wraps. The computer program product includes computer readable storage medium having program instructions embodied therewith. The program instructions is executable by a computer to cause the tape drive to perform a method for writing data of a tabular form including at least two or more rows and columns on a tape column by column. The method includes the steps of (a) setting partitions with at least a number greater than or equal to a number of columns to a tape, and (b) writing data of each column in one corresponding partition. The partition has at least two or more wraps. The data is written in order toward the bottom of the wraps from the top of the wraps in the width direction of the partition while reciprocating the beginning of the tape to the end of the tape in the longitudinal direction of the tape so that the writing of the last data of the column ends at the beginning of tape.

In another aspect of the present invention, a computer program product for writing data on a tape loaded in a tape drive is provided. The tape has at least two or more partitions. Each partition has at least two or more wraps. The computer program product includes computer readable storage medium having program instructions embodied therewith. The program instructions is executable by a computer to cause the tape drive to perform a method of setting partitions on a tape when writing data of a tabular form including at least two or more rows and columns on the tape column by column. The method includes the steps of (a) obtaining data size S1 of a column to be written to the tape, (b) dividing the data size S1 of the column by data size S2 of a wrap of the tape to obtain a quotient N which rounds down fraction, (c) if the quotient N being an odd number, setting number of wraps in a partition which data of the column is written to (N+1), and (d) if the quotient N being an even number, setting number of wraps in a partition which data of the column is written to (N+2).

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Figure 1:
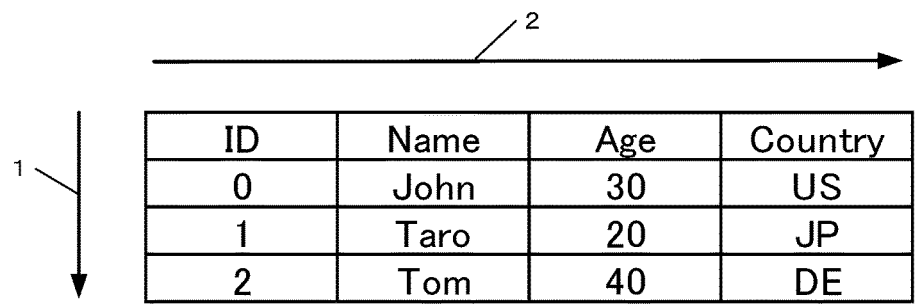
FIG. 1 is a diagram showing an exemplary configuration of a columnar database, according to an embodiment of the present disclosure.

Referring now to FIG. 1, a diagram depicting an exemplary configuration of a columnar database is shown, according to an embodiment of the present disclosure. The columnar database may include at least two or more rows and at least two or more columns. For illustration purposes only, without intent of limitation, the columnar database of FIG. 1 includes four rows and four columns.

The columnar database stores a table containing a plurality of data in units of columns, as shown by arrow 1 in FIG. 1, this may facilitate executing operations frequently performed in big data analytics such as, for example, reading a specific column or columns from all rows at a higher speed compared with a conventional Row-Oriented Database which stores in units of rows, as shown by arrow 2 in FIG. 1.

For example, when an SQL statement such as reading the Name column and the Country column for all of the rows in FIG. 1 has been issued in a row-oriented database (arrow 2), it is necessary to seek each of the columns (e.g. ID, Age, etc.), some of which do not need to be read, as such the entire table may need to be analyzed.

On the other hand, when the same SQL statement has been issued for a columnar database in which data is stored column by column (i.e., on a per-column basis), the reading operation (arrow 1) is performed only for the Name column and the Country column, and the seeking is not performed for the columns that do not need to be read. This example implies that the columnar database is well-suited to perform certain types of operations where only particular columns need to be read. When the size of the analysis-target data stored in the columnar database largely increases, it may be unrealistic trying to store all of the data on a disk storage device or a flash storage device. In such a case, it may be desired that the data less frequently referred to can be stored on a tape.

Figure 2:
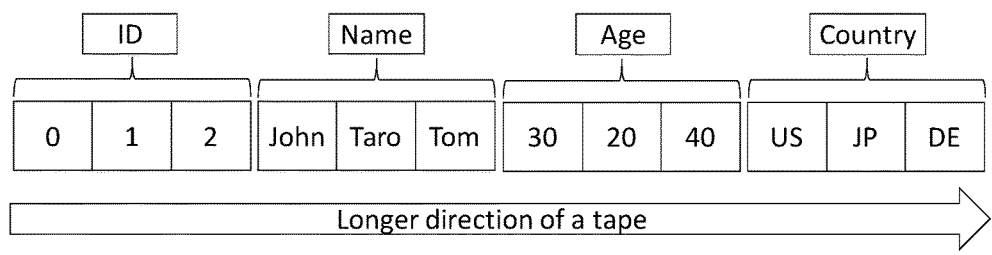
FIG. 2 is a diagram showing an exemplary configuration for storing a columnar database on a tape by continuously storing each column of a table in a longitudinal direction, according to an embodiment of the present disclosure.

A simple approach to storing columnar databases on a tape includes continuously storing each column of a table in the longest direction of the tape (i.e., lengthwise) as shown in FIG. 2. However, when this approach is adopted and an SQL statement is issued for reading the column stored on the beginning of the tape and the column stored on the end of the tape, it may be necessary to seek the entire tape from beginning to end, and data that does not need to be read is analyzed during this process.

Another approach used for storing a columnar database on a tape includes storing each column on two or more tapes and read the columns simultaneously from two or more drives. In this approach, the columns of one table in the database have to be separated in order to be stored in the two or more tapes, and it may be necessary to provide as many drives as columns need to be simultaneously read to efficiently read each column.

One way to store a table of a columnar database on a tape may include writing data from the table column by column to a predetermined partition of the tape such that the seek/read time for a particular column or columns of the table is reduced. One embodiment by which to store a table of a columnar database on a tape is described in detail below by referring to the accompanying drawings in FIGS. 3-8.

Figure 3:
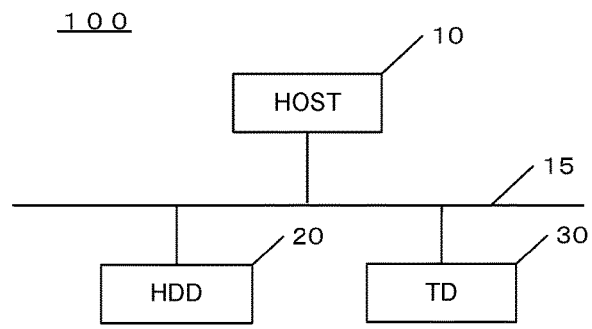
FIG. 3 is a diagram showing an exemplary configuration of a storage system, according to an embodiment of the present disclosure.

Referring now to FIG. 3, a diagram showing an exemplary configuration of a storage system 100 is shown, according to an embodiment of the present disclosure. The storage system 100 includes a host 10, a hard disk drive (HDD) 20, and a tape drive (TD) 30 which may communicate through a network 15. It should be note that the storage system 100 may include a plurality of each of the host 10, the HDD 20 and the TD 30 only one of which is shown.

The host 10 may include computers, such as a server or a personal computer (PC). The HDD 20 may be included in the host 10. Moreover, other storage devices such as a semiconductor memory (e.g. SSD) can be used instead of the HDD 20. The TD 30 may include a single type or a set type TD such as a tape library. The host 10 may include a tape capable of storing data according to embodiments of the present disclosure.

Figure 4:
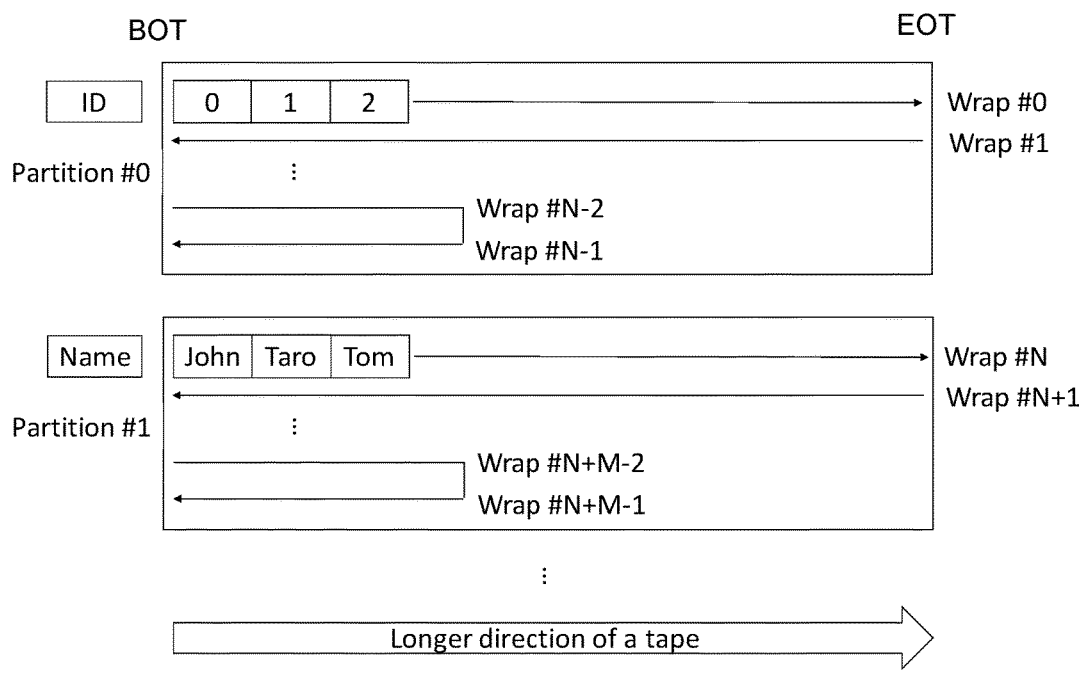
FIG. 4 is a diagram illustrating a method for writing columnar data on partitions of a tape, according to an embodiment of the present disclosure.

Referring now to FIG. 4, a diagram of an exemplary configuration of a tape including two partitions is shown, according to an embodiment of the present disclosure. In this embodiment, the tape (e.g. TD 30 of FIG. 3) may include partition #0 and partition #1. The partition of a tape refers to a divided area in the tape, and each partition may include a plurality of wraps #0, #1 . . . #N . . . as shown in FIG. 4. A wrap may typically refer to a unit from/to which data may be read/write at one time, where the wrap extends in the longest direction of the tape. As shown in FIG. 4, when data has been written in the wrap #0 from the beginning to the end of the tape (also referred to as "EOT"), the data is then written in the wrap #1 in the reverse direction from the end to the beginning of the tape (also referred to as "BOT").

With continued reference to FIG. 4, an example of writing two-columns data using the table shown in FIG. 1 is described, according to embodiments of the present disclosure. As shown above in FIG. 1, the two columns in the table are named "ID" and "Name". Each column is stored in a different partition, that is, data of the ID column is stored in the partition #0 and data of the Name column is stored in the partition #1.

The beginning of the data (0, John) of each column (ID, Name) is arranged at the beginning of the corresponding partition (#0, #1) on the tape. Further, after having read all of the values of a certain column, the end of the column is also arranged at the beginning of the tape such that the seek functionality is not stopped while reading the next column. This may occur, for example, when the next to last wrap (#N−2, #N+M−2) is folded back at the intermediate portion and the end of the column is arranged at the beginning of the last wrap (#N−1 or #N+M−1) in each partition (#0 or #1) of the tape, as illustrated in FIG. 4. As such, known methods used in free-running of Recursive Accumulating Backhitchless Flush (RABF) may be adopted for folding back the wrap at the intermediate portion.

In preparation for writing a table of a columnar database on a tape using embodiments of the present disclosure, partitions may be created in at least a number corresponding to the number of columns to be written. In other words, the number of set partitions in a tape may be greater than or equal to the number of columns of the table to be stored on the tape. Data storage size of each partition may be obtained by dividing the tape size by the number of columns, such that all the columns have the same data size. However, the data storage size for each partition should preferably be equal to the data size of the corresponding column. It should be noted that this embodiment is described on the premise that the size of the column does not exceed the size of the partitions.

Figure 5:
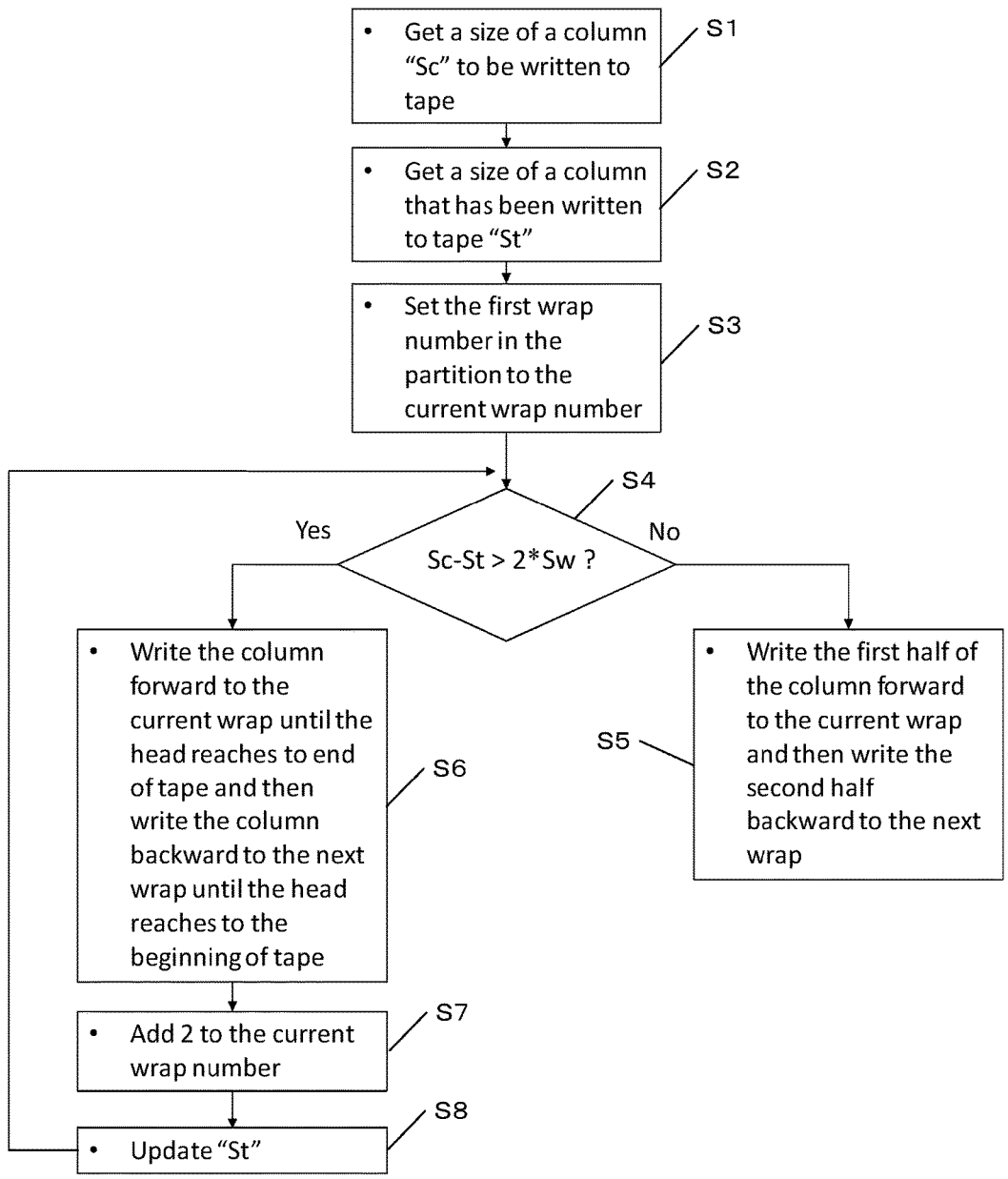
FIG. 5 is a flowchart describing the steps of a method for writing columnar data on partitions of a tape, according to an embodiment of the present disclosure.

Referring now to FIG. 5, a flowchart illustrating the steps of a method for writing a column to a partition of a tape. In this embodiment, the steps described in FIG. 5 may be performed, for example, by the tape drive (TD) 30 which is controlled by the host 10 in the storage system 100 of FIG. 3.

In step S1 of FIG. 5, a data size of a column Sc to be written to a tape is obtained. In step S2, a data size of a portion of the column Sc that has already been written on the tape is given as St and an initial value "0" is set. In step S3, the current wrap is identified as the wrap at the beginning of the partition. In step S4, when the remaining size (Sc−St) of the column has been written on the tape, it is checked whether or not the writing process can proceed from the BOT to the EOT and then go back from the EOT towards the BOT. More specifically, suppose that the capacity per one wrap from the BOT to the EOT is given by Sw, when (Sc−St)>2*Sw is satisfied, then the writing process can proceed from the BOT to the EOT and then go back to the BOT.

In step S5, if the writing process cannot go back to the beginning of the tape, (Sc−St) is divided by two (2) and the first half is written to the current wrap forward from the BOT, and the writing process switches back to the second half. This second half is written to the next wrap in the reverse direction. In step S6, if the writing process can go back to the BOT, the writing process in the current wrap is carried out until the EOT is reached and the next writing round is carried out on the next wrap from the EOT to the BOT. In step S7, the wrap number is incremented by two (2). In step S8, the written data size St to the tape is updated. Then, the process may go back to step S4. Steps S4 to S8 may be repeated until all of the values of a certain column have been written to the tape. The steps described in FIG. 5 may repeat until all of the columns are written in the corresponding partitions of the tape.

It should be noted that, in this embodiment, the beginning and the end of a certain column are both arranged at the beginning of the tape (BOT), and the position of the head resides at the BOT at the time when the entire column has been read. Accordingly, the tape seek operation does not need to be carried out when reading the next column, as such reading time is reduced. The proposed method for storing a columnar database on a tape may be especially suited to continuously reading a plurality of columns. It should be noted that the above explanations have been given on the premise that the size of the table does not exceed that of one single tape. However, the proposed method can be used in applications where the size of the table extends to the size of two or more tapes and achieve the same or equivalent results.

Figure 6:
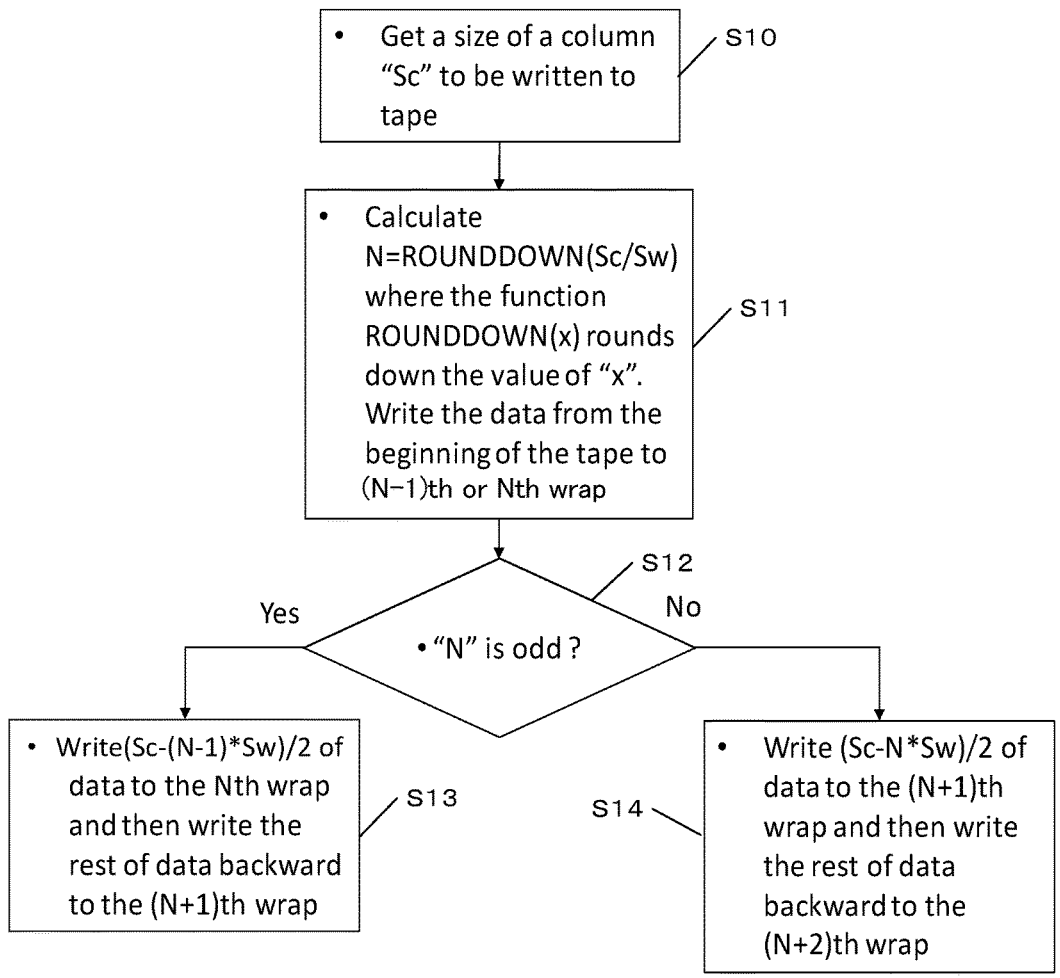
FIG. 6 is a flowchart showing the steps of a method for writing columnar data on partitions of a tape, according to another embodiment of the present disclosure.

Referring now to FIG. 6, a flowchart illustrating an alternate method for writing a certain column to a certain partition of a tape is shown, according to another embodiment of the present disclosure. Similarly to the process described above with reference to FIG. 5, the steps of the method described in FIG. 6 may be performed, for example, by the tape drive (TD) 30 which is controlled by the host 10 in the storage system 100 of FIG. 3.

In step S10 of FIG. 6, a data size of a column Sc to be written to a tape is obtained. In step S20, a first the data size Sc of the column is divided by data size Sw of a wrap of the tape to obtain a quotient N with a rounded down fraction. That is, N=ROUNDDOWN (Sc/Sw) is calculated, where the function ROUNDDOWN (x) rounds down the value of "x". Next, the data of the column is written from the beginning of the tape (partition) to (N−1)$^{th}$ wrap or N$^{th}$ wrap.

Figure 7:
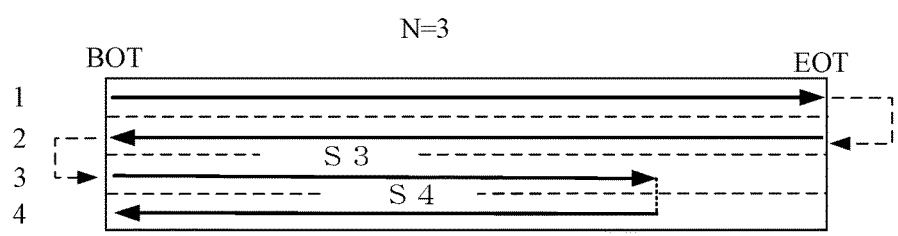
FIG. 7 is a diagram illustrating an implementation of a method for writing columnar data on a partition of a tape, according to an embodiment of the present disclosure.

In step S12, it is judged whether N is odd or even. If N is odd, in step S13, data size (Sc−(N−1)*Sw)/2 of the data is written to the N$^{th}$ wrap and then the rest of data size (Sc−(N−1)*Sw)/2 of the data is written backward to the (N+1)$^{th}$ wrap. For example, FIG. 7 illustrates a simple case where N=3. In this case, the data of the column is written in two wraps 1 and 2 from the BOT to the EOT or the EOT to the BOT. The data S3 which has data size (Sc−2Sw)/2 is written from the BOT all the way through wrap 3 as shown in FIG. 7. The data S4 which has the same data size (Sc−2Sw)/2 is written from the position of wrap 4 directly below the last position of the data S3 in wrap 3 to the BOT in wrap 4 as shown in FIG. 7.

Figure 8:
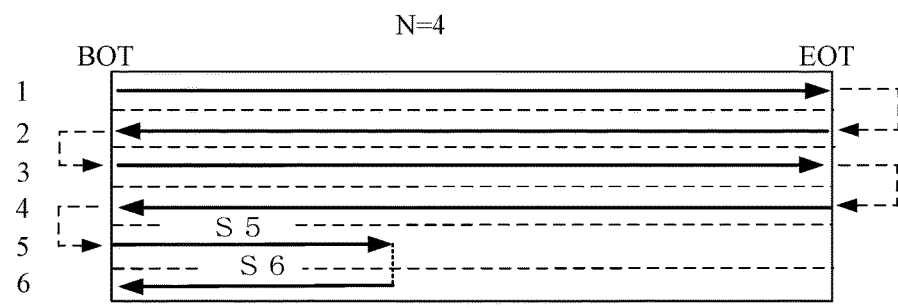
FIG. 8 is a diagram illustrating an implementation of a method for writing columnar data on a partition of a tape, according to another embodiment of the present disclosure.

If N is even, in step S14, data size (Sc−N*Sw)/2 of the data is written to the (N+1)$^{th}$ wrap and then the rest of data size (Sc−N*Sw)/2 of the data is written backward to the (N+2)$^{th}$ wrap. For example, FIG. 8 shows a simple case where N=4. In this case, the data of the column is written in four wraps 1, 2, 3 and 4 from the BOT to the EOT or the EOT to the BOT. The data S5 which has data size (Sc−4Sw)/2 is written from the BOT all the way through wrap 5 as shown in FIG. 8. The data S6 which has the same data size (Sc−4Sw)/2 is written from the position of wrap 6 directly below the last position of the data S5 in wrap 5 to the BOT in wrap 6 as shown in FIG. 8.

Therefore, by setting a number of partitions on the tape, where the number of partitions is greater than or equal to a number of columns of the table to be written to the tape, and writing data from each column of the table to at least one partition of the tape, with the at least one partition including two or more wraps, data is written from a top of the two or more wraps towards a bottom of the two or more wraps in a direction of a width of the at least one partition, and the written data is reciprocated from a beginning of the tape to an end of the tape in a longitudinal direction of the tape such that writing of a last data entry of one column ends at a beginning of the two or more wraps. As such data may be written from a table in a columnar database to a tape.

Additionally, embodiments of the present disclosure may help setting partitions on the tape by obtaining a data size S1 of a column to be written to the tape, and dividing the data size S1 of the column by a data size S2 of a wrap of the tape to obtain a quotient N, the result of the quotient N is rounded down using a ROUNDDOWN function, data from the column is written to a (N+1) wrap of a partition of the tape when the quotient N is an odd number and written to a (N+2) wrap of a partition of the tape when the quotient N is an even number.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer system for setting partitions on a tape, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   obtaining a data size S1 of a column to be written to the tape; and
   dividing the data size S1 of the column by a data size S2 of a wrap of the tape to obtain a quotient N, wherein a result of the quotient N is rounded down using a ROUNDDOWN function.

2. The computer system of claim 1, wherein data from the column is written to a (N+1) wrap of a partition of the tape when the quotient N is an odd number.

3. The computer system of claim 1, wherein data from the column is written to a (N+2) wrap of a partition of the tape when the quotient N is an even number.

4. The computer system of claim 3, wherein writing data from the column to a (N+1) wrap of the partition of the tape when the quotient N is an odd number further comprises:
   setting a first area extending from a beginning of a $N^{th}$ wrap to a data size $(S1-(N-1)*S2)/2$ as a data writing area in the partition; and
   setting a second area from a position of a $(N+1)^{th}$ wrap directly below a last position of the data size $(S1-(N-1)*S2)/2$ to be written in the $N^{th}$ wrap to a beginning of the $(N+1)^{th}$ wrap as data writing area in the partition comprising the data size $(S1-(N-1)*S2)/2$.

5. The computer system of claim 4, wherein writing data from the column to a (N+2) wrap of the partition of the tape when the quotient N is an even number further comprises:
   setting a third area from the beginning of the $(N+1)^{th}$ wrap to a data size $(S1-N*S2)/2$ as writing data area in the partition; and
   setting a fourth area from a position of a $(N+2)^{th}$ wrap directly below a last position of the data size $(S1-N*S2)/2$ to be written in the $(N+1)^{th}$ wrap to a beginning of the $(N+2)^{th}$ wrap as a data writing area comprising the data size $(S1-N*S2)/2$.

* * * * *